United States Patent
Baumann (10) Patent No.: US 8,845,030 B2
(45) Date of Patent: Sep. 30, 2014

(54) PASSENGER SEAT DEVICE

(75) Inventor: Jürgen Baumann, Bodman-Ludwigshafen (DE)

(73) Assignee: RECARO Aircraft Seating GmbH & Co. KG, Schwäbisch Hall (DE)

(*) Notice: Subject to any disclaimer, the term of this patent is extended or adjusted under 35 U.S.C. 154(b) by 293 days.

(21) Appl. No.: 13/376,644

(22) PCT Filed: Jun. 16, 2010

(86) PCT No.: PCT/EP2010/003615
§ 371 (c)(1),
(2), (4) Date: Feb. 21, 2012

(87) PCT Pub. No.: WO2010/145812
PCT Pub. Date: Dec. 23, 2010

(65) Prior Publication Data
US 2012/0139305 A1    Jun. 7, 2012

(30) Foreign Application Priority Data
Jun. 19, 2009 (DE) .................. 10 2009 025 505

(51) Int. Cl.
*A47C 7/54* (2006.01)
*B60N 2/46* (2006.01)

(52) U.S. Cl.
USPC ................. 297/411.32; 297/411.34

(58) Field of Classification Search
USPC ............... 297/411.32, 411.34, 411.3
See application file for complete search history.

(56) References Cited

U.S. PATENT DOCUMENTS

| | | | |
|---|---|---|---|
| 2,621,708 A * | 12/1952 | Luce, Jr. | 297/117 X |
| 5,584,534 A * | 12/1996 | Kuranami | 297/411.32 X |
| 7,093,904 B1 * | 8/2006 | McMillen | 297/411.32 |
| 7,367,627 B2 * | 5/2008 | Figueras Mitjans | 297/411.32 |
| 2008/0265646 A1 | 10/2008 | Enberg et al. | |

FOREIGN PATENT DOCUMENTS

| | | |
|---|---|---|
| DE | 3512953 A1 | 11/1986 |
| EP | 0 621 174 A1 | 10/1994 |
| EP | 1 236 642 A2 | 9/2002 |

OTHER PUBLICATIONS

International Search Report mailed on Jul. 21, 2010 for the corresponding International patent application No. PCT/EP2010/003615 (English copy enclosed).
German Search Report mailed on Dec. 1, 2010 for the corresponding German patent application No. 10 2009 025 505.2.
International Preliminary Report mailed on Jan. 5, 2012 for the corresponding International patent application No. PCT/EP2010/003615 (English copy enclosed).

* cited by examiner

*Primary Examiner* — Anthony D Barfield
(74) *Attorney, Agent, or Firm* — Posz Law Group, PLC (57) ABSTRACT

An airplane passenger seat device includes a seat part, which has a seat surface, a seat direction and a main body, which abuts an aisle in a installed state in a means of transportation and which, in a usage position, laterally covers the seat surface in a region that is lateral to the seat surface with respect to the seat direction. It is proposed that the passenger seat device has a bearing unit for moveably mounting the main body, which is provided to move the main body from the usage position into a release position by way of a movement relative to the seat surface, which causes the region lateral to the seat surface to be released.

19 Claims, 7 Drawing Sheets

PASSENGER SEAT DEVICE

CROSS REFERENCE TO RELATED APPLICATIONS

This application is a U.S. national stage application of PCT/EP2010/003615 filed on Jun. 16, 2010, and claims priority to, and incorporates by reference, German patent application No. 10 2009 025 505.2 filed on Jun. 19, 2009.

BACKGROUND

An airplane seat device comprising a seat part and an armrest bracket, which laterally bounds, on a side facing an aisle of the airplane, a seat surface formed by the seat part, is already known.

SUMMARY

The invention is based on the object of providing a passenger seat device of the generic type, by means of which passenger seat device the comfort of passengers with restricted mobility can be improved.

Further advantageous embodiments of the invention can be found in the dependent claims.

The invention is based on a passenger seat device, in particular an airplane passenger seat device, comprising a seat part which has a seat surface, a seat direction and a base body which, in an installed state in a means of transportation, abuts an aisle, and in a position of use laterally covers the seat surface in a region to the side of the seat surface with respect to the seat direction.

It is proposed that the passenger seat device has a bearing unit for movably supporting the base body, which bearing unit is provided for adjusting, with a movement relative to the seat surface, the base body from the position of use into a release position, said movement causing the region to the side of the seat surface to be released. A "seat surface" is to be understood here as meaning, in particular, a surface which is provided for supporting the backside of a seated passenger. It differs in particular from a backrest surface which serves to support the passenger's back. In an upright position of a passenger seat, the seat surface is preferably orientated essentially horizontally with respect to a floor of the means of transportation. The "seat direction" of the passenger seat device is intended to be understood as being, in particular, a direction which is horizontal relative to a floor of a means of transportation and which, in an upright position of the passenger seat device, is oriented perpendicular with respect to a front edge of the seat part or of the seat surface, where in the front edge of the seat part or of the seat surface serves to support the lower part of a seated passenger's thighs and the knee region. The seat direction can correspond to the transporting direction of the means of transportation. In particular, in the case of application in an airplane cabin, the seat direction corresponds to the flying direction. In the case of application in a railroad car, a long-distance bus or a passenger ship, the seat direction can be oriented counter to the transporting direction or transversely with respect thereto. An "aisle" is to be understood in the context of an arrangement of passenger seats as being a space which is provided for movement of passengers within the seat arrangement, for example in order to permit passengers to access an assigned passenger seat. In addition, the base body "abuts" the aisle owing to the fact that it forms, in particular, an outer surface which bounds the space provided for the aisle. A region which is arranged "to the side of the seat surface" with respect to the seat direction is to be understood, in particular, as being a region which abuts the seat surface in a lateral direction which, in relation to the floor of the means of transportation, is oriented horizontally and perpendicularly with respect to the seat direction. The expression "provided" is to be understood, in particular, as meaning specially configured, shaped or equipped.

The bearing unit can also serve as a guide unit which is provided for guiding the base body from the position of use into the release position.

Since the base body which abuts the aisle laterally covers the seat surface in the region to the side of said seat surface in the position of use of said base body, the base body constitutes an obstacle which, when considered in the lateral direction, is arranged between the seat surface and the aisle, preventing direct access from the aisle to the seat surface in the lateral direction. As a result of the embodiment according to the invention, simple access to the seat surface can be made available by means of the releasing of the region to the side of the seat surface, wherein increased comfort can be achieved for a passenger with restricted mobility.

In one preferred embodiment of the invention it is proposed that the base body has a receptacle region which is provided for receiving at least one functional component, as a result of which a particularly comfortable passenger seat device can be obtained. The functional component, which can be optionally extended from the receptacle region in the base body by the passenger, can be, for example, a table device. The passenger seat device advantageously has an electronic unit which is arranged in a storage position in the receptacle region. The electronic unit can be, in particular, a video entertainment unit, a monitoring unit, etc.

In addition, a particularly ergonomic embodiment of the passenger seat device can be obtained if the passenger seat device has an armrest unit with an armrest surface, wherein the base body bears the armrest surface. In this context, the armrest unit can be embodied in one piece with the base body, as a result of which a compact and structurally simple passenger seat device can be obtained.

In particular it is proposed that the bearing unit is provided for bringing about a movement of at least one part of the base body laterally with respect to the seat direction when the base body is transferred into the release position. Such a lateral movement of at least one part of the base body permits the base body to be transferred into the release position, which release position is adapted to the embodiment of other components of a passenger seat, such as, in particular, of a backrest. The bearing unit particularly advantageously causes the part of the base body to be moved in the direction of the aisle of the means of transportation.

For example, the base body can be pushed in the lateral direction by means of the bearing unit before it is adjusted into the release position by pivoting, for example. However, a structurally simple embodiment can be obtained if the bearing unit is provided for bringing about an inclined movement of the base body relative to a vertical direction during a transfer into the release position. An "inclined movement" relative to a vertical direction is to be understood, in particular, as being a departure from a plane which is oriented perpendicularly with respect to the floor of the means of transportation and, in particular, parallel to the seat direction.

A particularly simple embodiment of the passenger seat device can be obtained if said passenger seat device has a pivoting device for pivotably supporting the base body relative to the seat surface. In particular it is proposed that the pivoting device has at least two different pivoting axes, wherein one of the pivoting axes is provided for an inclined movement of the base body relative to a vertical direction before pivoting into the release position about the other pivoting axis. In an alternative embodiment variant, the pivoting device can be configured in such a way that an inclined movement and pivoting of the base body in the upward direction take place simultaneously, wherein when the base body pivots upward, said base body is inclined relative to the vertical direction.

If the pivoting device has a single pivoting axis about which the base body is pivotably mounted for the purpose of transferring into the release position, it is possible to provide a structurally simple solution which requires a particularly small amount of material and small number of components.

In one preferred embodiment it is proposed that the single pivoting axis of the pivoting device is arranged inclined with respect to the floor of the means of transportation and perpendicularly with respect to the seat direction. During the pivoting of the base body out of the position of use and into the release position, a movement of the base body can therefore be brought about in an advantageously easy fashion, which movement is formed by a superimposed, simultaneous movement composed of a pivoting movement in the upward direction and an inclined movement relative to the vertical direction.

In a further advantageous embodiment, it is proposed that the pivoting axis be arranged parallel to the floor of the means of transportation and rotated relative to the lateral direction. The term "rotated relative to the lateral direction" is to be understood in this context as meaning, in particular, that a direction defined by the pivoting axis and the lateral direction differ by more than 0.5°. This arrangement of the single pivoting axis of the pivoting device makes it advantageously easily possible to bring about a movement of the base body, which movement comprises, during the pivoting of the base body out of the position of use and into the release position, a superimposed, simultaneous movement composed of an upward pivoting movement and an inclined movement relative to the vertical direction.

In addition it is proposed that the passenger seat device have a locking unit which is provided for locking the base body in the position of use, as a result of which a high degree of safety in the application of the passenger seat device can be achieved.

In this context it is also proposed that the passenger seat device have an activation unit for unlocking the base body, which activation unit is provided for automatically bringing about at least one partial movement of the base body when the base body is unlocked, as a result of which the operator comfort can be further improved.

DRAWING

Further advantages emerge from the following description of the drawing. The drawing illustrates an exemplary embodiment of the invention. The description and the claims contain numerous features in combination. A person skilled in the art will expediently also consider the features individually and combine them to form appropriate further combinations.

DETAILED DESCRIPTION OF THE PREFERRED EMBODIMENT

FIGS. 1 to 5, 6 and 7 as well as 8 and 9 illustrate alternative exemplary embodiments. Components, features and functions which remain substantially the same are denoted by the same reference symbols in all cases. However, in order to differentiate the exemplary embodiments the letters a, b and c are added to the reference symbols in the exemplary embodiments, and in this context with respect to components, features and functions which remain the same it is possible to refer to the description of the exemplary embodiment in FIGS. 1 to 5.

Figure 1:
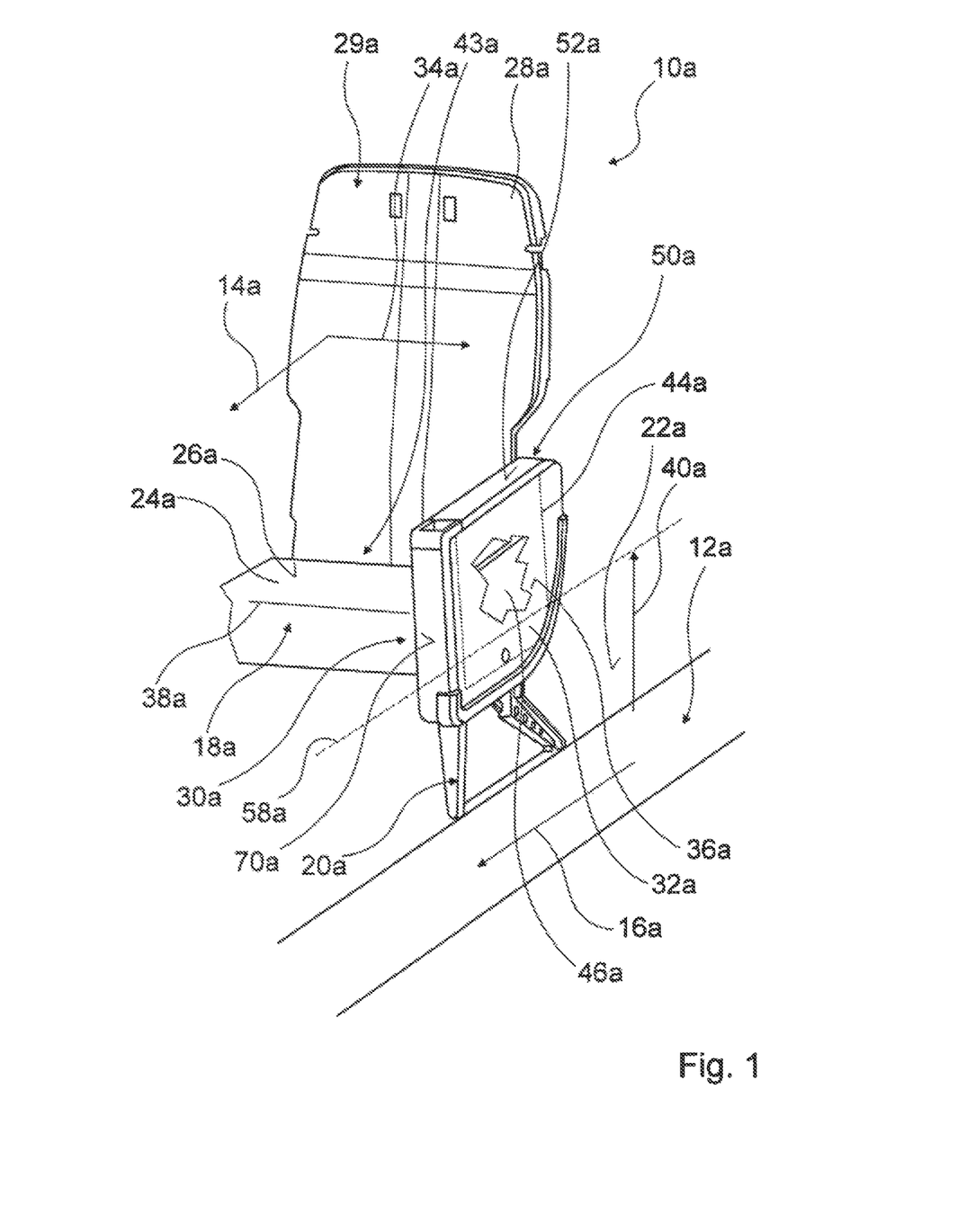
FIG. 1 is a perspective view of a passenger seat with an armrest bracket which abuts an aisle.

FIG. 1 shows a perspective view of a passenger seat 10a which is embodied as an airplane seat. The following description relates likewise to FIG. 2 and FIG. 3, which show further views of the arrangement from FIG. 1. In an installed state, the passenger seat 10a is arranged in a means of transportation (not illustrated in more detail) which is embodied as an airplane. The passenger seat 10a can be used in other means of transportation in other embodiments, to be precise, for example, in a railroad car, a long-distance bus, a passenger ship, etc. In the installed state shown, the passenger seat 10a abuts an aisle 12a which is provided for movement of passengers within the means of transportation. In particular, the aisle 12a extends in the longitudinal direction of the means of transportation and permits access to rows of passenger seats 10a and/or to individual passenger seats 10a which are arranged along the aisle 12a. The passenger seat 10a has a seat direction 14a which corresponds, in the example under consideration, to the transporting direction and the flying direction and which is oriented parallel to the main direction of extent 16a of the aisle 12a. Rows of passenger seats 10a have a multiplicity of passenger seats 10a which are arranged one next to the other in a direction perpendicular to the main direction of extent 16a of the aisle 12a.

Figure 2:
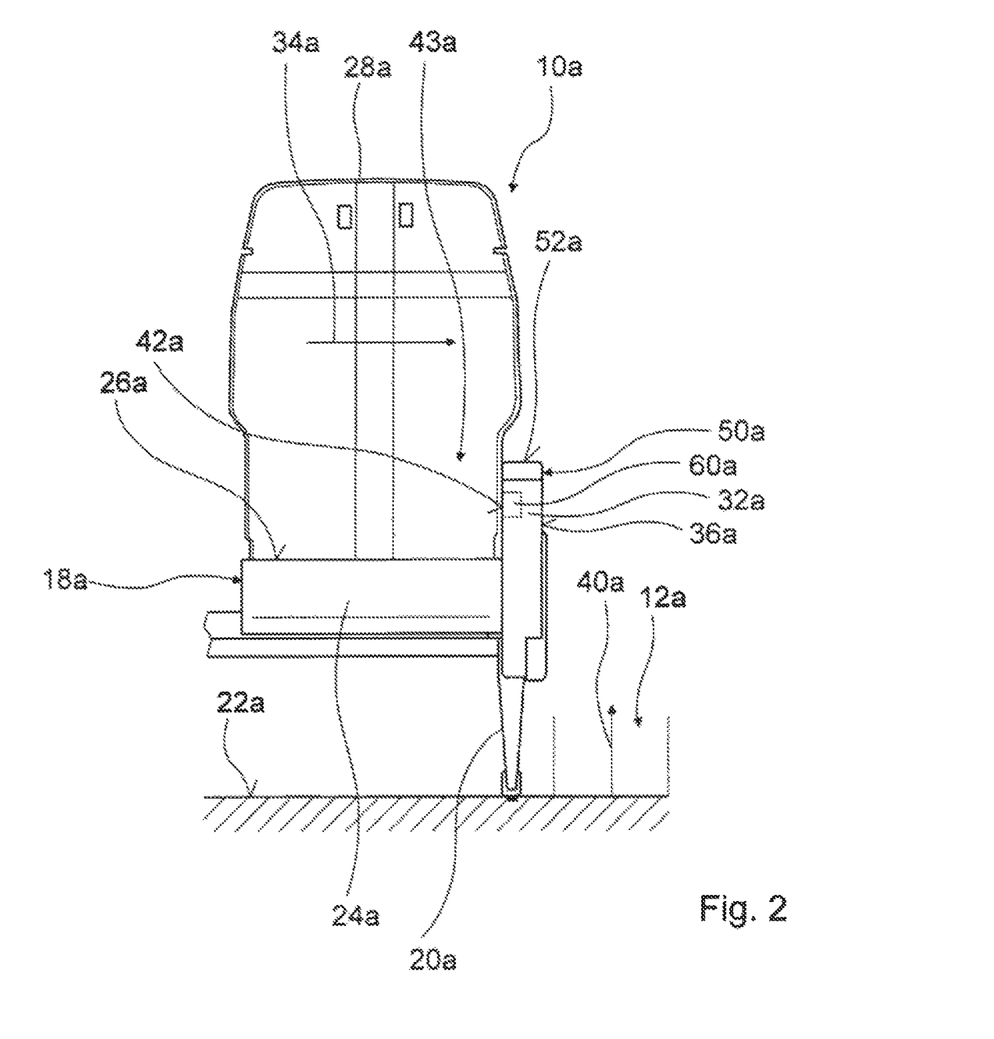
FIG. 2 is a front view of the passenger seat.
Figure 3:
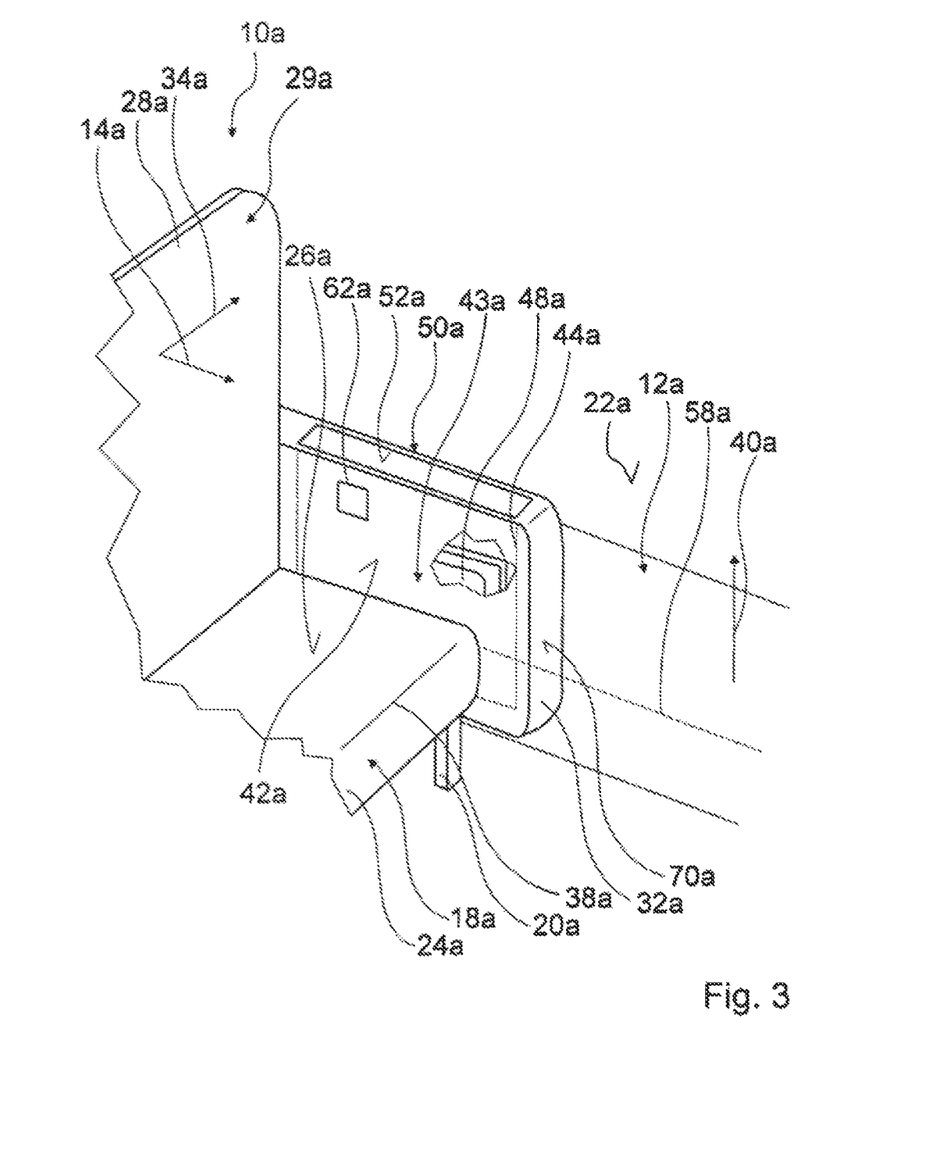
FIG. 3 is a further perspective view of the passenger seat from FIG. 1.

The passenger seat 10a has a passenger seat device comprising a seat part 18a which is mounted in an upright position on a floor 22a of a means of transportation by means of an upright positioning unit 20a. The seat part 18a has a seat surface 26a which is formed by an upholstery element 24a and in an upright position of the passenger seat 10a is oriented essentially parallel to the floor 22a of the means of transportation. The passenger seat 10a also comprises a backrest 28a which is illustrated with the upholstery element removed in the figures. In the mounted state of the upholstery element, it forms a backrest surface which in an upright position of the passenger seat 10a is oriented substantially perpendicularly with respect to the seat direction 14a. The backrest 28a also forms a headrest 29a.

In addition, a base body 32a of the passenger seat device in the form of a seat bracket is arranged in a region 30a to the side of the seat surface 26a. The term "to the side" with respect to the seat direction 14a is defined by means of a lateral direction 34a which is oriented parallel to the floor 22a of the means of transportation and perpendicularly with respect to the seat direction 14a. The base body 32a abuts the aisle 12a, wherein it forms an outer surface 36a which directly faces the aisle 12a. With respect to the lateral direction 34a, the base body 32a is arranged between the seat surface 26a and the aisle 12a. The base body 32a extends in the seat direction 14a from a rear end in the region of the backrest 28a to a front end which is arranged in the seat direction 14a at least in the region of a front edge 38a of the seat surface 26a. In the exemplary embodiment under consideration, the front end of the base body 32a is arranged further forward than the front edge 38a of the seat surface 26a. In other words, the base body 32a projects beyond the front edge 38a of the seat surface 26a in the seat direction 14a. With respect to a vertical direction 40a perpendicularly with respect to the floor 22a of the means of transportation, the base body 32a extends from a lower end, which is arranged lower than the seat surface 26a, to be precise lower than the seat part 18a, up to an upper end which is arranged higher than the seat surface 26a. The base body 32a forms a side surface 42a (see FIG. 2) which is located opposite the outer surface 36a and faces the seat surface 26a. The side surface 42a is oriented vertically and connects the region of the lower end of the base body 32a to the region of the upper end of the base body 32a in a coherent fashion. Accordingly, the seat surface 26a is covered laterally by the base body 32a, to be precise by its side surface 42a, with respect to the seat direction 14a, or, in other words, the seat surface 26a is covered by the base body 32a and, respectively, by the side surface 42a in the lateral direction 34a. In addition, since the upper end of the base body 32a is arranged higher than the seat surface 26a, a seat region 43a, which extends above the seat surface 26a in the vertical direction 40a and in which the upper part of the body of a seated passenger is arranged (see, in particular, FIG. 5), is also covered laterally by the base body 32a.

The base body 32a is embodied as a seat bracket, to be precise, in particular, as an armrest bracket. It is equipped with a cavity which is provided as a receptacle region 44a for receiving functional components 46a, 48a of the passenger seat 10a (see also FIG. 3). In the exemplary embodiment under consideration, the functional components 46a, 48a in the receptacle region 44a are embodied as a table device or as an electronic unit in the form of a video entertainment unit. The functional components 46a, 48a can be extended from receptacle region 44a in the base body 32a on request by a passenger seated in the passenger seat 10a for an application.

In the region of its upper end, the base body 32a serves as an armrest unit 50a which forms an armrest surface 52a which, in the position of use of the base body 32a, is oriented substantially in parallel to the floor 22a of the means of transportation. In this way, the armrest surface 52a is supported by the base body 32a. In the exemplary embodiment under consideration, the armrest unit 50a is embodied in one piece with the base body 32a.

Figure 4:
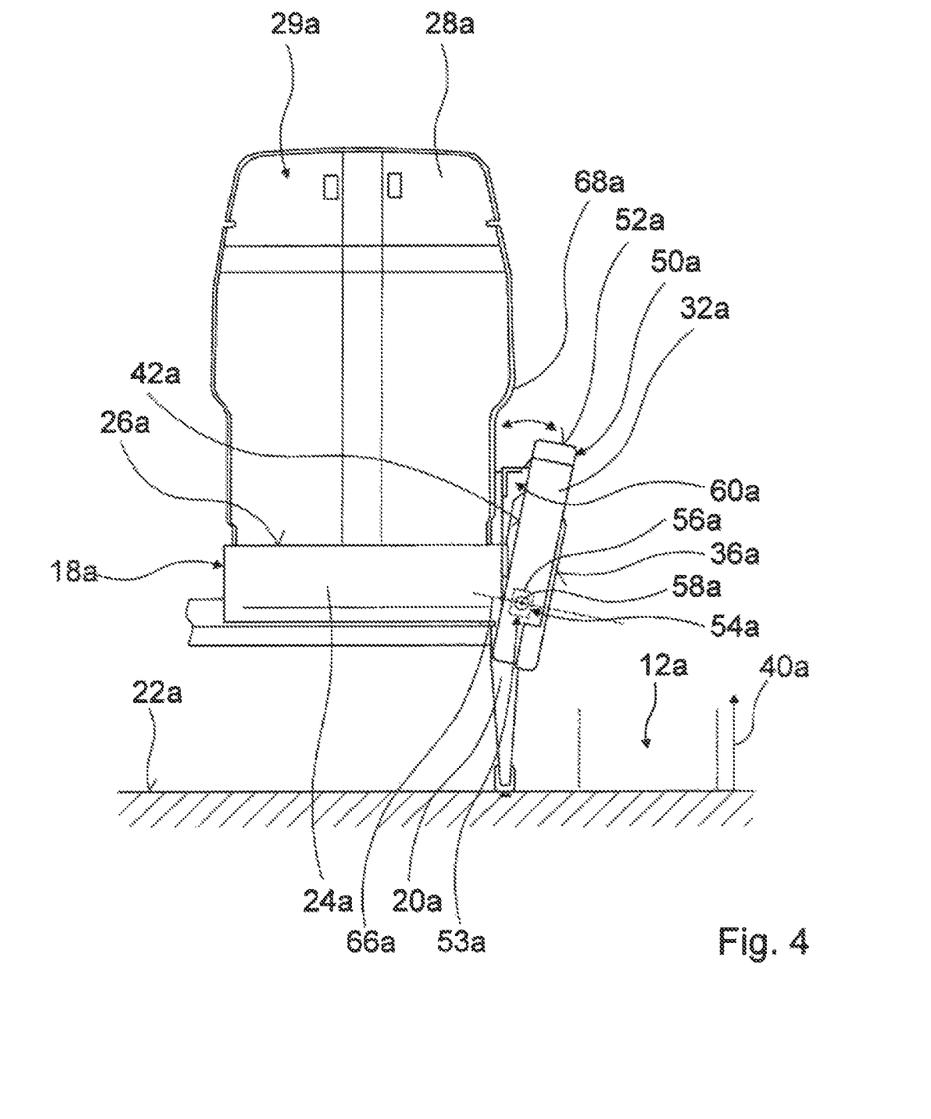
FIG. 4 is a perspective view of the passenger seat in the view from FIG. 2, with the armrest bracket inclined outward.
Figure 5:
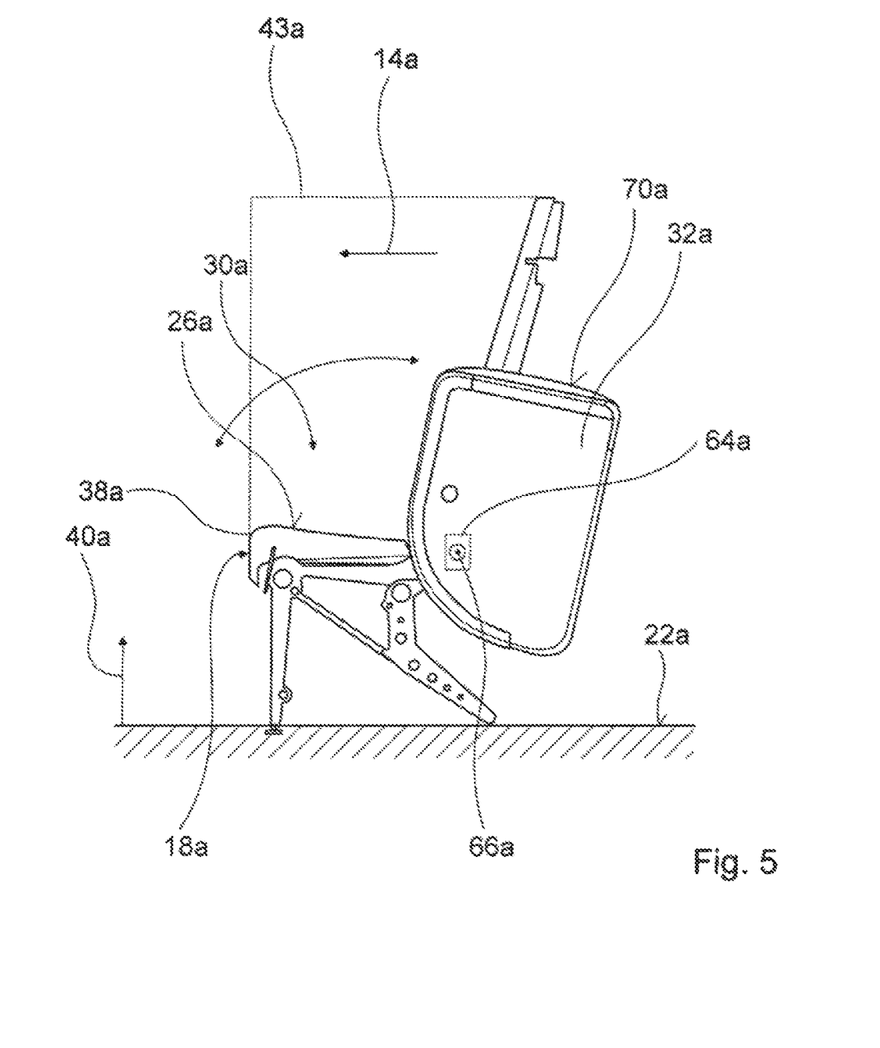
FIG. 5 is a side view of the passenger seat, with the armrest bracket pivoted upward.

In order to facilitate access to the passenger seat 10a for a person with restricted mobility, the base body 32a or the seat bracket can be moved relative to the seat surface 26a. As is shown by FIGS. 4 and 5, the base body 32a can be adjusted from the position of use (FIGS. 1 to 3) via a tilted intermediate position (FIG. 4) into a release position (FIG. 5) in which the region 30a to the side of the seat surface 26a is released. In this release position, the seat surface 26a and the seat region 43a are not covered by the base body 32a, at least in the region above the front edge 38a of the seat surface 26a, starting from the seat surface 26a at least as far as the level of the headrest 29a. As a result, a disabled person can be transferred directly from a wheelchair into the passenger seat 10a in the lateral direction 34a.

In order to adjust the base body 32a from the position of use into the release position, a bearing unit 53a is provided (FIG. 4). The latter has a pivoting device 54a which serves for pivotably supporting the base body 32a relative to the seat surface 26a. The bearing unit 53a is provided, in particular, for bringing about a movement of at least a part of the base body 32a laterally with respect to the seat direction 14a when the base body 32a is transferred into the release position. The pivoting device 54a has for this purpose a first pivoting unit 56a which forms a pivoting axis 58a which extends in the seat direction 14a (see FIGS. 1 to 3). The pivoting unit 56a permits, through a pivoting movement of the base body 32a about the horizontal pivoting axis 58a, an inclined movement of the base body 32a relative to the vertical direction 40a. During this inclined movement, the upper end of the base body 32a or the armrest unit 50a carries out, with the armrest surface 52a, a tilting movement in the direction of the aisle 12a. For this purpose, the pivoting axis 58a is arranged in the lower half of the base body 32a.

In one use of the passenger seat 10a in a transportation operation of the means of transportation, the base body 32a is held and locked in position by means of a locking unit 60a (FIG. 2). This can be done by means of a system (not described in more detail) of latching elements or of further locking systems which appear appropriate to a person skilled in the art. For the base body 32a to be unlocked by a crew of the means of transportation, an activation unit 62a is provided (see FIG. 3) which is arranged on the base body 32a. The activation unit 62a is operatively connected to an actuator unit (not described in more detail) which automatically brings about an inclined movement of the base body 32a when the activation unit 62a is activated. For this purpose, use of energy stores, which appear appropriate to a person skilled in the art, to carry out the movement, such as, for example, mechanical and/or pneumatic spring elements, is conceivable.

The pivoting device 54a also has a second pivoting unit 64a which forms a pivoting axis 66a which is different from the first pivoting axis 58a. As can be inferred from FIG. 4, the pivoting axis 66a is inclined relative to the floor 22a of the means of transportation. The pivoting axis 66a is also oriented perpendicularly with respect to the pivoting axis 58a. The pivoting unit 64a serves to pivot the base body 32a up about the pivoting axis 66a from the inclined position shown in FIG. 4 into the release position. As a result of the pivoting of the base body 32a in an inclined position, the base body 32a can be moved past a side edge 68a of the backrest 28a.

As can be inferred from a comparison of FIG. 5 with FIG. 1 or 3, the base body 32a is adjusted in such a way that a front side 70a, which is vertical in the position of use and perpendicular with respect to the seat direction 14a, of the base body 32a is raised by the adjustment. In particular, the front side 70a in the release position is arranged at the upper end of the base body 32a with respect to the vertical direction 40a. This corresponds to a rotation about the pivoting axis 66a of approximately 90°. As a result of this adjustment, a large part of the seat region 43a is released, in particular in the region of the front edge 38a of the seat surface 26a, and comfortable accessibility to the seat region 43a is provided.

Figure 6:
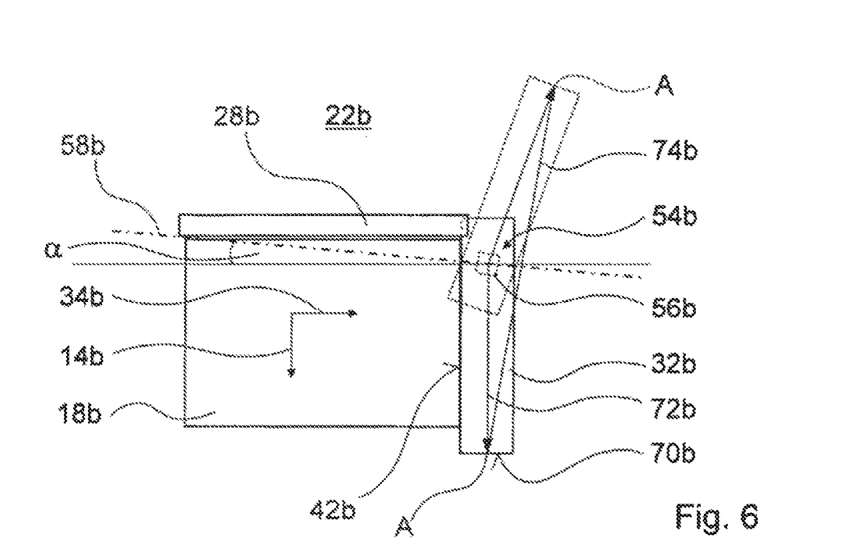
FIG. 6 is a plan view of a passenger seat with a further exemplary embodiment of a passenger seat device.
Figure 7:
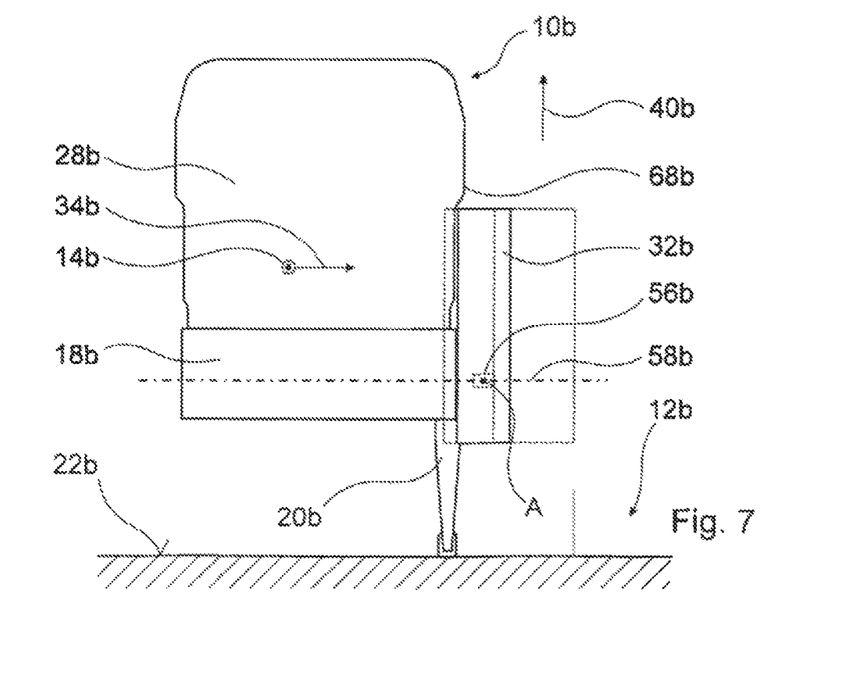
FIG. 7 is a front view of the passenger seat according to FIG. 6.

FIGS. 6 and 7 illustrate an alternative exemplary embodiment of a passenger seat device of a passenger seat 10b in a highly schematic form, in order to clarify a movement of a base body 32b from a position of use to a release position. The passenger seat device has a seat part 18b which is positioned upright on a floor 22b of the means of transportation by means of an upright positioning unit 20b which is indicated in FIG. 7. The passenger seat 10b comprises a backrest 28b and has a seat direction 14b. In an installation state in an aircraft, an arrangement of the passenger seat 10b corresponds to that of the exemplary embodiment according to FIGS. 1 to 5.

In contrast to the exemplary embodiment according to FIGS. 1 to 5, a pivoting device 54b of the passenger seat device has a single pivoting unit 56b which forms a pivoting axis 58b, about which a base body 32b is mounted so as to be transferred in a pivoting fashion into the release position. From a plan view according to FIG. 6 it is apparent that the pivoting axis 58b is arranged rotated through an angle α relative to a lateral direction 34b, with the result that the pivoting axis 58b points forward when viewed in the lateral direction 34b. For reasons of clarity, an angle α of 10° was used in FIGS. 6 and 7. From the front view in FIG. 7 it can also be inferred that the pivoting axis 58b is arranged parallel to the floor 22b of the means of transportation.

In a position of use of the base body 32b, both a front side 70b and a side surface 42b of the base body 32b extend parallel to a vertical direction 40b. When the base body 32b is transferred from the position of use into a release position, the base body 32b moves along a lateral surface of a virtual cone, which is described about the pivoting axis 58b, between a point A on the front side 70b of the base body 32b and the pivoting axis 58b, during the transfer from a virtual connecting line 72b which extends parallel to the seat direction 14b in the position of use of the base body 32b. The point A migrates out of the position of use along a base line 74b of the virtual cone during the pivoting of the base body 32b. In order to illustrate the pivoting, the base body 32b is illustrated with a dashed line in FIG. 6, in a position which corresponds to pivoting through 180° in the clockwise direction from the position of use, when viewed from an aisle 12b. As is apparent from FIGS. 6 and 7, during the pivoting out of the position of use to the release position (not illustrated), which corresponds to pivoting of approximately 110° in the same pivoting direction about the pivoting axis 58b, the base body 32b carries out a superimposed, simultaneous movement composed of an upward pivoting movement and an inclined movement relative to the vertical direction 40b, with the result that the base body 32b can be moved past a side edge 68b of the backrest 28b.

Figure 8:
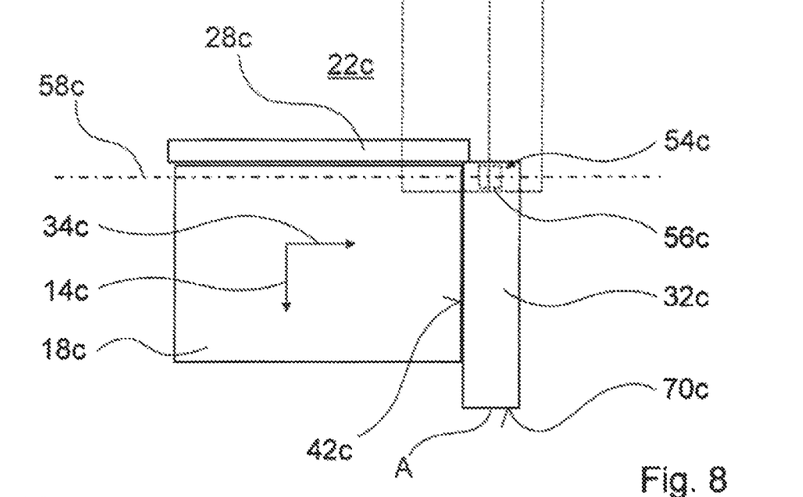
FIG. 8 is a plan view of a passenger seat with a further exemplary embodiment of a passenger seat device.
Figure 9:
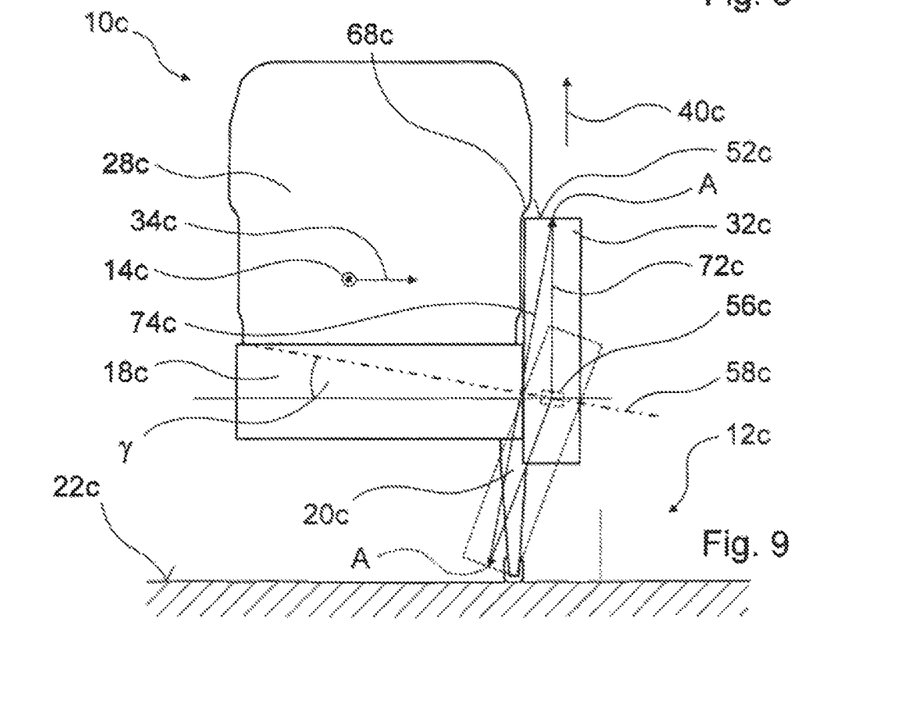
FIG. 9 is a front view of the passenger seat according to FIG. 8.

FIGS. 8 and 9 illustrate a further exemplary embodiment of a passenger seat device of a passenger seat 10c in a highly schematic form, in order to make clear a movement of a base body 32c from a position of use to a release position. The passenger seat device has a seat part 18c which is positioned upright on a floor 22c of a means of transportation by means of an upright positioning unit 20c indicated in FIG. 9. The passenger seat 10c comprises a backrest 28c and has a seat direction 14c. In an installed state in an airplane, an arrangement of the passenger seat 10c corresponds to that of the exemplary embodiment according to FIGS. 1 to 5.

In contrast to the exemplary embodiment according to FIGS. 1 to 5, a pivoting device 54c of the passenger seat device has a single pivoting unit 56c which forms a pivoting axis 58c about which a base body 32c is mounted so as to be transferred in a pivoting fashion into the release position. From a front view according to FIG. 9 it is apparent that the pivoting axis 58c is arranged inclined by an angle γ with respect to the floor 22c of the means of transportation, with the result that the pivoting axis 58c points downward when viewed in a lateral direction 34c. For reasons of clarity, an angle γ of 10° was used in FIGS. 8 and 9. It can also be inferred from the plan view in FIG. 8 that the pivoting axis 58c is arranged perpendicularly with respect to the seat direction 14c.

In a position of use of the base body 32c, both a front side 70c and a side surface 42c of the base body 32c extend parallel to a vertical direction 40c. When the base body 32c is transferred from the position of use into a release position, the base body 32c moves along a lateral surface of a virtual cone which, during the transfer, is described about the pivoting axis 58c, between a point A on an armrest surface 52c of the base body 32c and the pivoting axis 58c, by a virtual connecting line 72c which extends parallel to the vertical direction 40c in the position of use of the base body 32c. During the pivoting of the base body 32c, the point A migrates out of the position of use along a base line 74c of the virtual cone. In order to illustrate the pivoting, the base body 32c is illustrated with a dashed line in FIG. 9 in a position which corresponds to pivoting through 180° in the clockwise direction from the position of use, when viewed from an aisle 12c. As is apparent from FIGS. 8 and 9, during the pivoting out of the position of use to the release position (not illustrated), which corresponds to pivoting of approximately 110° in the same pivoting direction about the pivoting axis 58c, the base body 32c carries out a superimposed, simultaneous movement composed of an upward pivoting movement and an inclined movement relative to the vertical direction 40c, with the result that the base body 32c can be moved past a side edge 68c of the backrest 28c.

The invention claimed is:

1. A passenger seat device comprising
a seat part which has a seat surface, a seat direction and a base body which, in an installed state in a means of transportation, abuts an aisle, and in a position of use laterally covers the seat surface in a region to the side of the seat surface with respect to the seat direction, and
a bearing unit for movably supporting the base body, which bearing unit is provided for adjusting, with a movement relative to the seat surface, the base body from the position of use into a release position, said movement causing the region to the side of the seat surface to be released, wherein
the bearing unit is provided for bringing about a movement of at least one part of the base body laterally with respect to the seat direction when the base body is transferred into the release position, and for bringing about an inclined movement of the base body relative to a vertical direction during a transfer into the release position, and wherein,
as a result of the inclined movement of the base body relative to the vertical direction, the base body is rotated rearwardly at least partly past a rear side edge of a backrest.

2. The passenger seat device as claimed in claim 1, wherein the base body has a receptacle region which is provided for receiving at least one functional component.

3. The passenger seat device as claimed in claim 2, further comprising
an electronic unit which is arranged in a storage position in the receptacle region.

4. The passenger seat device as claimed in claim 3, further comprising
an armrest unit with an armrest surface, wherein the base body bears the armrest surface.

5. The passenger seat device as claimed in claim 3, wherein the bearing unit is provided for bringing about a movement of at least one part of the base body laterally with respect to the seat direction when the base body is transferred into the release position.

6. The passenger seat device as claimed in claim 3, further comprising
a pivoting device for pivotably supporting the base body relative to the seat surface.

7. The passenger seat device as claimed in claim 2, further comprising
an armrest unit with an armrest surface, wherein the base body bears the armrest surface.

8. The passenger seat device as claimed in claim 2, wherein the bearing unit is provided for bringing about a movement of at least one part of the base body laterally with respect to the seat direction when the base body is transferred into the release position.

9. The passenger seat device as claimed in claim 2, further comprising
a pivoting device for pivotably supporting the base body relative to the seat surface.

10. The passenger seat device as claimed in claim 1, further comprising
an armrest unit with an armrest surface, wherein the base body bears the armrest surface.

11. The passenger seat device as claimed in claim 10, wherein
the bearing unit is provided for bringing about a movement of at least one part of the base body laterally with respect to the seat direction when the base body is transferred into the release position.

12. The passenger seat device as claimed in claim 1, further comprising
a pivoting device for pivotably supporting the base body relative to the seat surface.

13. The passenger seat device as claimed in claim 12, wherein
the pivoting device has at least two different pivoting axes, and wherein
one of the pivoting axes is provided for the inclined movement of the base body relative to a vertical direction before pivoting into the release position about the other pivoting axis.

14. The passenger seat device as claimed in claim 12, wherein
the pivoting device has a single pivoting axis about which the base body is pivotably mounted for the purpose of transferring into the release position.

15. The passenger seat device as claimed in claim 14, wherein
the pivoting axis is arranged inclined with respect to a floor of a means of transportation and perpendicularly with respect to the seat direction.

16. The passenger seat device as claimed in claim 14, wherein
the pivoting axis is arranged parallel to the floor of the means of transportation and rotated relative to a lateral direction.

17. The passenger seat device as claimed in claim 1, further comprising
a locking unit which is provided for locking the base body in the position of use.

18. The passenger seat device as claimed in claim 17, further comprising
an activation unit for unlocking the base body, which activation unit is provided for automatically bringing about at least one partial movement of the base body when the base body is unlocked.

19. A passenger seat, comprising:
a seat part which includes a seat surface upon which a user sits, a seat direction being the direction the users faces when sitting normally on the seat surface;
a back rest extending in a vertical direction, relative to a floor, from the seat surface which contacts a user's back when the user sits normally on the seat part;
a base body that when in use extends laterally over the seat surface, and when not in use extends in the vertical direction such that a top surface of the base body, when extended laterally, faces an aisle; and
a pivoting device
which enables a first pivoting movement of the base body about a first pivoting axis extending in the seat direction such that the base body attains a release position where the base body is tilted relative to the vertical direction, and
which further enables a second pivoting movement of the base body around a second pivoting axis perpendicular to both the seat direction and the vertical direction such that base body is moved beyond a side edge of the backrest.

* * * * *